(12) United States Patent
Nishigaki et al.

(10) Patent No.: US 10,647,360 B2
(45) Date of Patent: May 12, 2020

(54) VEHICULAR STRUCTURAL ELEMENT AND VEHICLE BODY FRONT SECTION STRUCTURE

(71) Applicant: KABUSHIKI KAISHA TOYOTA CHUO KENKYUSHO, Nagakute-shi, Aichi-ken (JP)

(72) Inventors: Hidekazu Nishigaki, Nagakute (JP); Yasuo Asaga, Nagakute (JP); Ichiro Aoi, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days.

(21) Appl. No.: 15/928,233

(22) Filed: Mar. 22, 2018

(65) Prior Publication Data

US 2018/0281864 A1 Oct. 4, 2018

(30) Foreign Application Priority Data

Apr. 3, 2017 (JP) .................................. 2017-073932

(51) Int. Cl.
*B62D 21/15* (2006.01)
*B62D 21/02* (2006.01)
*F16F 7/12* (2006.01)

(52) U.S. Cl.
CPC ........... *B62D 21/152* (2013.01); *B62D 21/02* (2013.01); *F16F 7/12* (2013.01)

(58) Field of Classification Search
CPC ...... B62D 25/084; B62D 25/16; B62D 25/20; B62D 27/02; B62D 29/008; B62D 25/085; B62D 25/105

USPC ..... 296/187.09, 193.11, 204, 207, 96.21, 29, 296/192; 180/274, 69.21
See application file for complete search history.

(56) References Cited

U.S. PATENT DOCUMENTS

| | | | | |
|---|---|---|---|---|
| 3,947,061 | A * | 3/1976 | Ellis ........................ | B60R 19/40 293/5 |
| 3,992,047 | A * | 11/1976 | Barenyi .................. | B60R 19/14 293/9 |
| 5,031,947 | A * | 7/1991 | Chen ....................... | B60R 19/02 267/139 |
| 5,431,087 | A * | 7/1995 | Kambara ............ | F15B 15/1404 92/146 |
| 6,764,118 | B2 | 7/2004 | DePottey et al. | |

(Continued)

FOREIGN PATENT DOCUMENTS

| | | |
|---|---|---|
| JP | 2006-143199 A | 6/2006 |
| JP | 2008-012942 A | 1/2008 |
| JP | 2008-503382 A | 2/2008 |

*Primary Examiner* — D Glenn Dayoan
*Assistant Examiner* — Sunsurraye Westbrook
(74) *Attorney, Agent, or Firm* — Oliff PLC

(57) ABSTRACT

A vehicular structural element that includes: a plurality of elongated tube-shaped members; and a retaining member that retains the plurality of elongated tube-shaped members, such that they are disposed alongside each other in a circumferential direction with respect to a predetermined central axis. A tubular assembly configured by an assembly of the plurality of elongated tube-shaped members has inner locations disposed at an inner region viewed along an axial direction set with a lower rigidity in the axial direction than outer locations disposed at an outer region viewed along the axial direction.

9 Claims, 8 Drawing Sheets

(56) References Cited

U.S. PATENT DOCUMENTS

| | | | |
|---|---|---|---|
| 8,383,380 B2* | 2/2013 | Kozlowski | C08G 65/329 424/94.3 |
| 8,864,198 B2* | 10/2014 | Kim | B60R 19/12 293/122 |
| 9,381,880 B2* | 7/2016 | Matecki | B60R 19/023 |
| 2005/0116498 A1* | 6/2005 | Kobayashi | B60R 19/18 296/155 |
| 2005/0285414 A1 | 12/2005 | Liu et al. | |
| 2006/0108169 A1 | 5/2006 | Borg et al. | |
| 2009/0078487 A1 | 3/2009 | Borg et al. | |
| 2015/0158444 A1* | 6/2015 | Wu | B60D 1/60 293/142 |
| 2016/0280163 A1* | 9/2016 | Matecki | B60R 19/023 |
| 2017/0327066 A1* | 11/2017 | Lakic | B60R 19/34 |

* cited by examiner

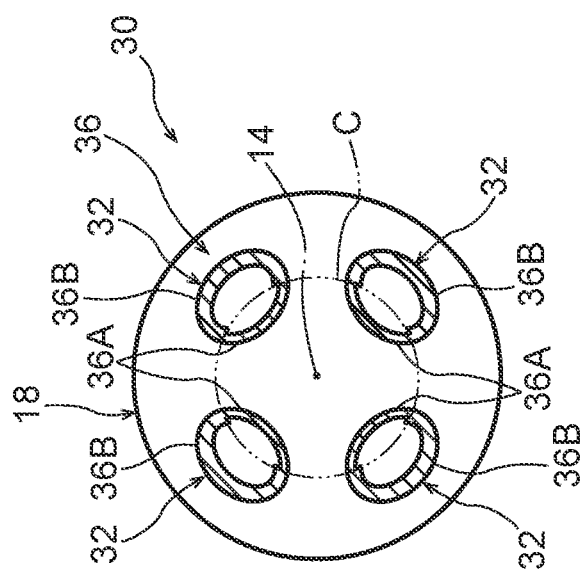
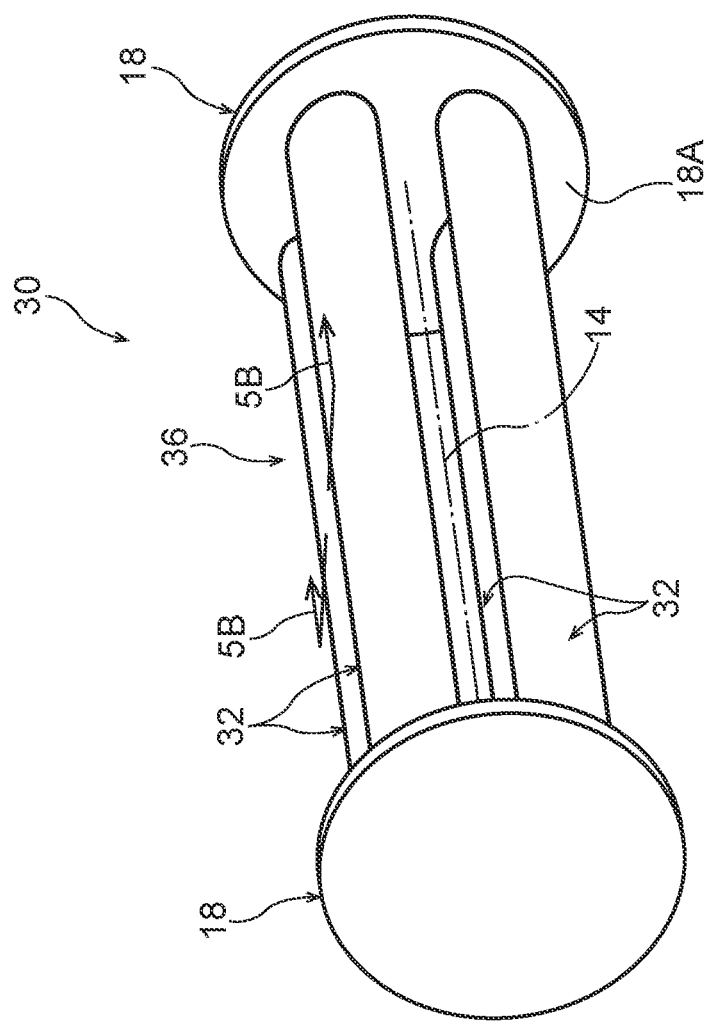
FIG.5B
FIG.5A

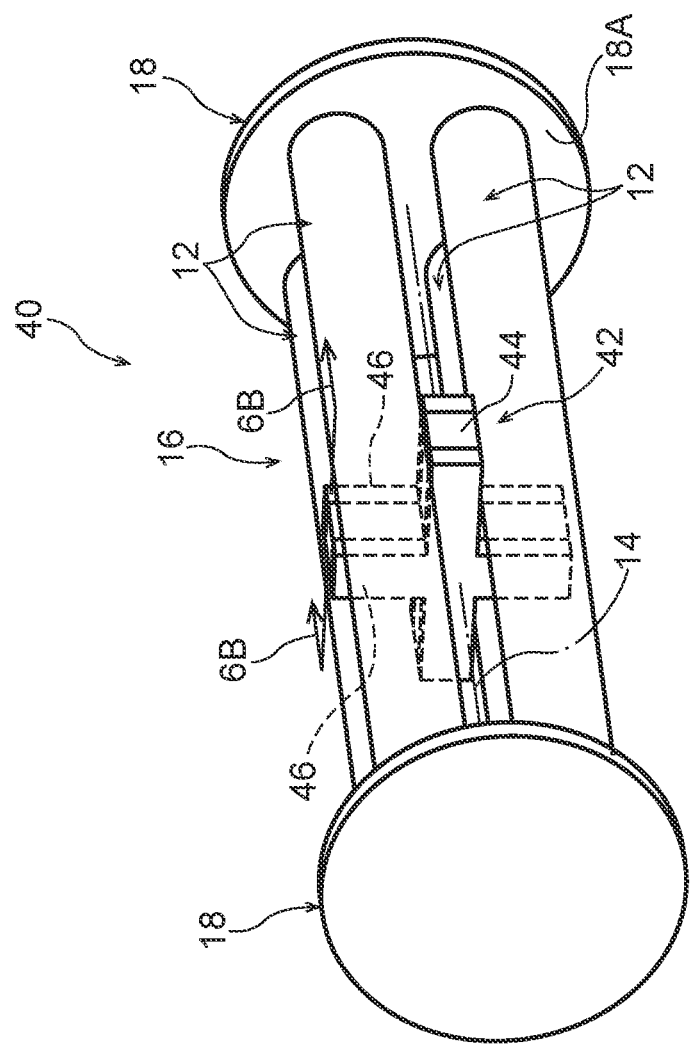
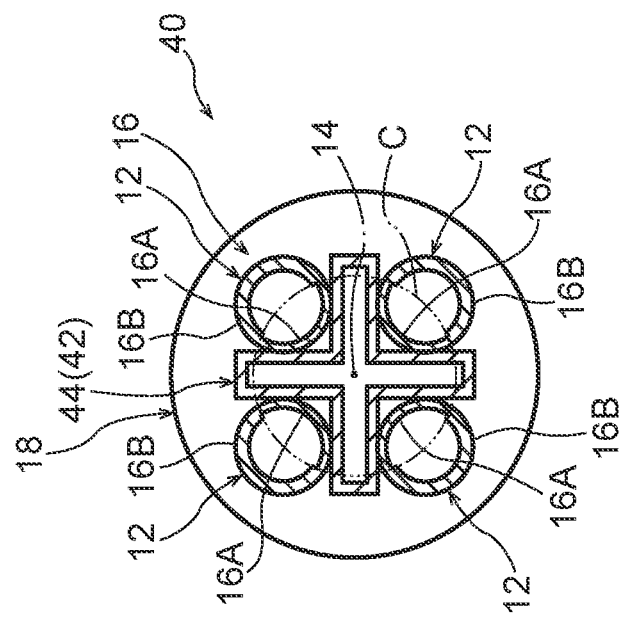

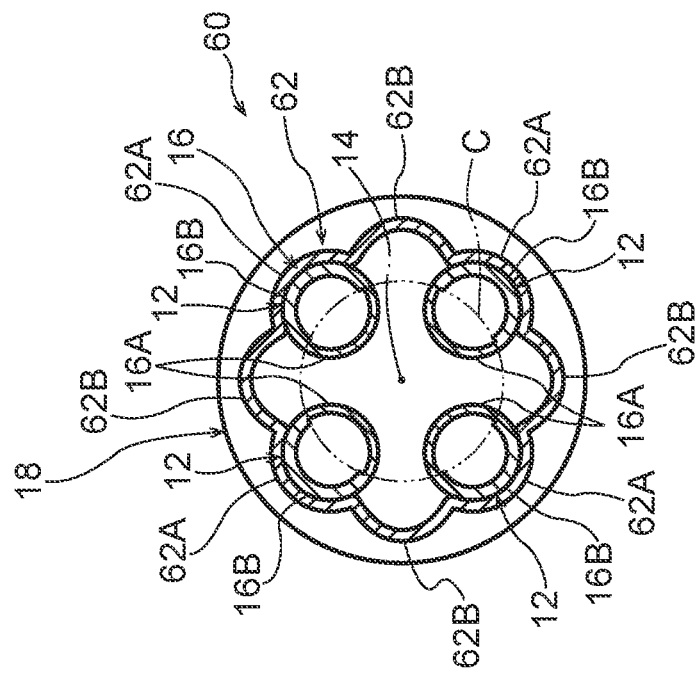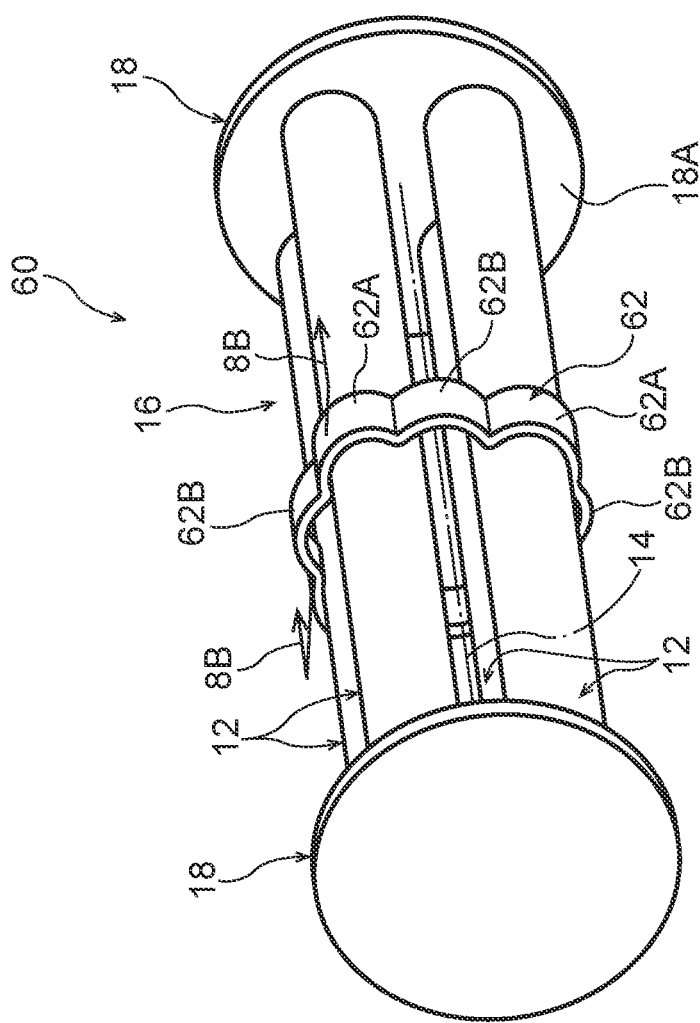

VEHICULAR STRUCTURAL ELEMENT AND VEHICLE BODY FRONT SECTION STRUCTURE

CROSS-REFERENCE TO RELATED APPLICATION

This application is based on and claims priority under 35 USC 119 from Japanese Patent Application No. 2017-073932 filed on Apr. 3, 2017, which is incorporated by reference herein.

BACKGROUND

Technical Field

The present disclosure relates to a vehicular structural element and a vehicle body front section structure.

Related Art

Various structures are employed for absorbing collision loads in vehicles (Japanese Patent Application Laid-Open (JP-A) No. 2008-12942, JP-A No. 2006-143199, U.S. Pat. No. 6,764,118, and Japanese National-Phase Publication No. 2008-503382). Recently, structures are also known that control a colliding portion of a vehicle in response to collision detection and the like by sensors so as to adopt a desired state (JP-A No. 2008-12942, JP-A No. 2006-143199, and U.S. Pat. No. 6,764,118).

In structures that employs sensors, for example, one might consider adopting a configuration that raises the flexural rigidity of a colliding portion of a vehicle in an energy absorption process during a collision. However, in such structures, the desired collision response cannot be achieved if there is a mistaken detection or a missed detection.

SUMMARY

An aspect of a vehicular structural element includes: a plurality of elongated tube-shaped members; and a retaining member that retains the plurality of elongated tube-shaped members, such that they are disposed alongside each other in a circumferential direction with respect to a predetermined central axis. A tubular assembly configured by an assembly of the plurality of elongated tube-shaped members has inner locations disposed at an inner region viewed along an axial direction set with a lower rigidity in the axial direction than outer locations disposed at an outer region viewed along the axial direction.

BRIEF DESCRIPTION OF THE DRAWINGS

Exemplary embodiments of the present disclosure will be described in detail based on the following figures, wherein:

FIG. 5A is a perspective view illustrating a vehicular structural element according to a second exemplary embodiment of the present disclosure;

FIG. 5B is a cross-section illustrating a state sectioned along line 5B-5B in FIG. 5A;

FIG. 6A is a perspective view illustrating a vehicular structural element according to a third exemplary embodiment of the present disclosure;

FIG. 6B is a cross-section illustrating a state sectioned along line 6B-6B in FIG. 6A;

FIG. 8A is a perspective view illustrating a vehicular structural element according to a fifth exemplary embodiment of the present disclosure; and FIG. 8B is a cross-section illustrating a state sectioned along line 8B-8B in FIG. 8A.

DETAILED DESCRIPTION

First Exemplary Embodiment

A description follows regarding a vehicular structural element and a vehicle body front section structure according to a first exemplary embodiment of the present disclosure, with reference to FIG. 1A to FIG. 4B.

Figure 1A:
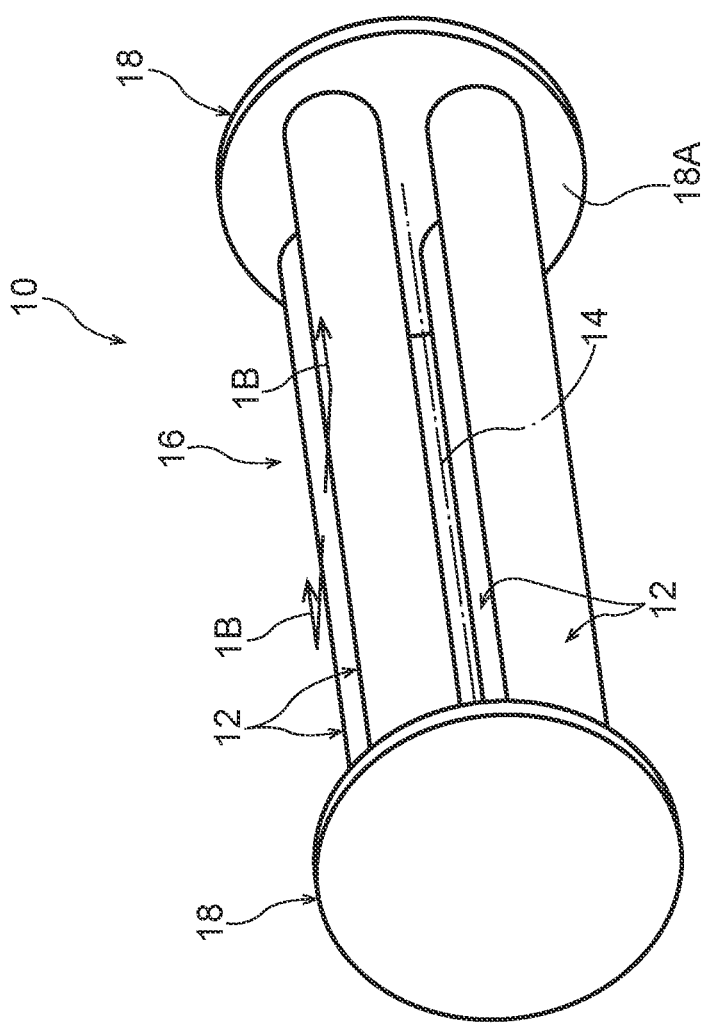
FIG. 1A is a perspective view illustrating a vehicle structure according to a first exemplary embodiment of the present disclosure.
Figure 1B:
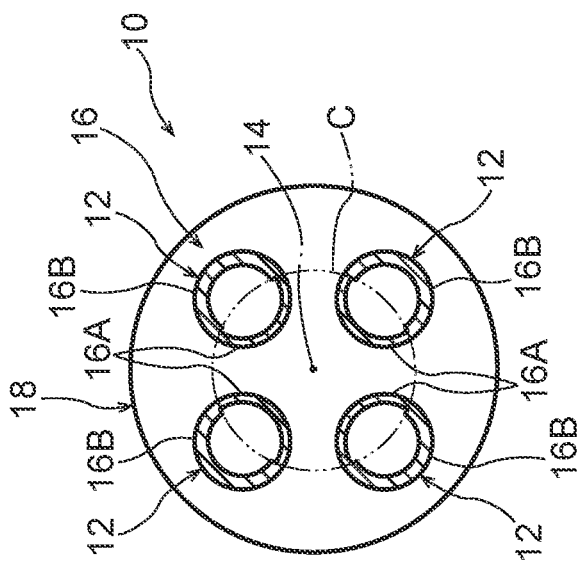
FIG. 1B is a cross-section illustrating a state sectioned along line 1B-1B in FIG. 1A.

FIG. 1A is a perspective view illustrating a vehicular structural element 10 according to the present exemplary embodiment, and FIG. 1B is a cross-section illustrating a state thereof sectioned along line 1B-1B (so as to be orthogonal to a central axis 14, described later) in FIG. 1A.

As illustrated in FIG. 1A and FIG. 1B, the vehicular structural element 10 includes four (or broadly speaking plural) pipe members 12 serving as elongated tube shaped members, and end retaining members 18 serving as retaining members that retain the four pipe members 12 so as to be arranged alongside each other in a circumferential direction about a predetermined central axis 14. The four pipe members 12, for example, extend in a straight line shape, and are disposed parallel to each other at equal intervals around the central axis 14.

The assembly of the four pipe members 12 configures a pipe assembly 16, serving as a tubular assembly. The two axial direction end portions of the pipe assembly 16 are joined, for example by welding, to flat faces 18A of the end retaining members 18 when in a state in which the positions of length direction end portions of the four pipe members 12 have been aligned and are abutting the flat faces 18A. Namely, the end retaining members 18 are formed as circular disks, are provided as a pair respectively disposed facing each other at the two axial direction sides of the pipe assembly 16, and retain the two axial direction end portions of the pipe assembly 16. Note that other than joining by welding, the joining between the end retaining members 18 and the pipe assembly 16 may, for example, be by another joining method, such as adhesive bonding.

The pipe members 12 are, for example, formed with circular cylinder profiles from a metal material (for example, a steel material, aluminum alloy material, or the like). Note that the pipe members 12 may also be formed from a resin material (which might be a fiber reinforced resin material). As illustrated in FIG. 1B, when the pipe assembly 16 is viewed along its axial direction (when viewed along the axial direction of the central axis 14), inner locations 16A disposed in an inner region of the pipe assembly 16 are set with thinner wall thicknesses and are set with a lower rigidity in the axial direction than outer locations 16B disposed in an outer region of the pipe assembly 16, when viewing along the axial direction. Note that the axial direction of the pipe assembly 16 is the same as the axial direction of the central axis 14 (a direction perpendicular to the page in FIG. 1B). To facilitate visibility in FIG. 1B, a boundary between the inner region and the outer region of the pipe assembly 16 is indicated by a double-dotted dashed-line circle C.

The differential thickness structure of each of the pipe members 12 can be set, for example, by joining together members of different wall thicknesses (joined by tailored blank processing, for example) to form the pipe members 12. Moreover, various settings may be employed for dimensions of the pipe members 12 such as the outer diameter, the wall thickness, and the length direction, depending on the application of the vehicular structural element 10.

Moreover, the difference in rigidity between the inner locations 16A and the outer locations 16B referred to above preferably does not exceed ⅓, in order to avoid an amount of bucking deformation at the inner locations 16A becoming too large when load acts along the axial direction of the pipe assembly 16.

Figure 4A:
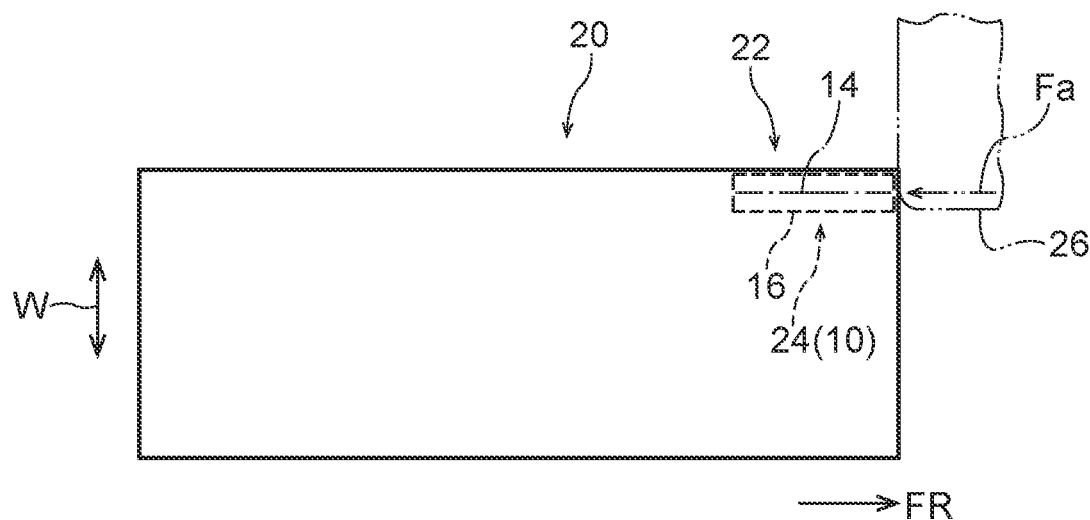
FIG. 4A is a schematic plan view to explain changes in state during a collision of a vehicle provided with the vehicular structural element of FIG. 1A and FIG. 1B, and illustrates a state prior to deformation of the vehicular structural element.

FIG. 4A is a schematic plan view illustrating a vehicle 20 (a car, for example) provided with a vehicle body front structure including the vehicular structural element 10. Note that the arrow FR in FIG. 4A and FIG. 4B indicates a vehicle forward direction, and the arrow W therein indicates a vehicle width direction. As illustrated in FIG. 4A, in the vehicle 20, the vehicular structural element 10 configures a front side member (also referred to as a "front side frame") 24 serving as a vehicle body configuration member of a vehicle body front section 22. The vehicular structural element 10 is disposed at the front section side and the side section side of the vehicle 20, and is set such that the axial direction of the pipe assembly 16 (the axial direction of the central axis 14) runs along the vehicle front-rear direction, in vehicle plan view. The front side member 24 is a member joined to a rear face side of a bumper extending along the vehicle width direction at a front end of the vehicle 20, and there is one of the front side members 24 joined to each side of the bumper.

Note that as a modified example of the present exemplary embodiment, a vehicular structural element with a similar configuration to that of the vehicular structural element 10 may be disposed as a vehicle body configuration member of a vehicle body front section (22) at the front section side and a side section side (a position basically the same as that of the vehicular structural element 10) of the vehicle (20), with an axial direction of a pipe assembly (16) set angled in vehicle plan view toward the vehicle width direction inner side on progression toward the vehicle front.

Operation and Advantageous Effects

The operation and advantageous effects of the above exemplary embodiment will now be described.

In the present exemplary embodiment, as illustrated in FIG. 1A and FIG. 1B, the end retaining members 18 retains the four pipe members 12 so as to be arranged alongside each other in the circumferential direction about the predetermined central axis 14. In the pipe assembly 16, this being an assembly of the four pipe members 12, the inner locations 16A disposed at the inner region when viewed along the axial direction are set with a lower axial direction rigidity than the outer locations 16B disposed at the outer region when viewed along the axial direction. Thus, when collision load acts on the pipe assembly 16 in its axial direction, energy is absorbed as the inner locations 16A deform so as to collapse at the inside of the four pipe members 12, and as the outer locations 16B deform so as to bulge toward the outside of the four pipe members 12.

Further explanation thereof will now be given with reference to FIG. 2A to FIG. 3B.

Figure 2A:
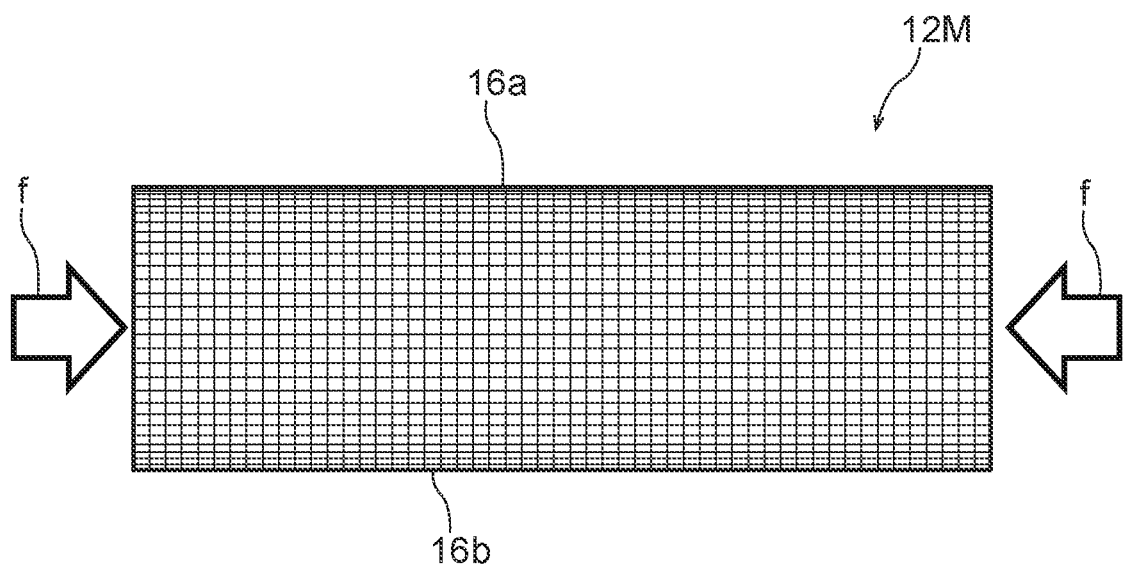
FIG. 2A is a diagram illustrating analysis results to explain a deformation state when compression load acts on a pipe member along its axial direction, and illustrates a state prior to deformation.
Figure 2B:
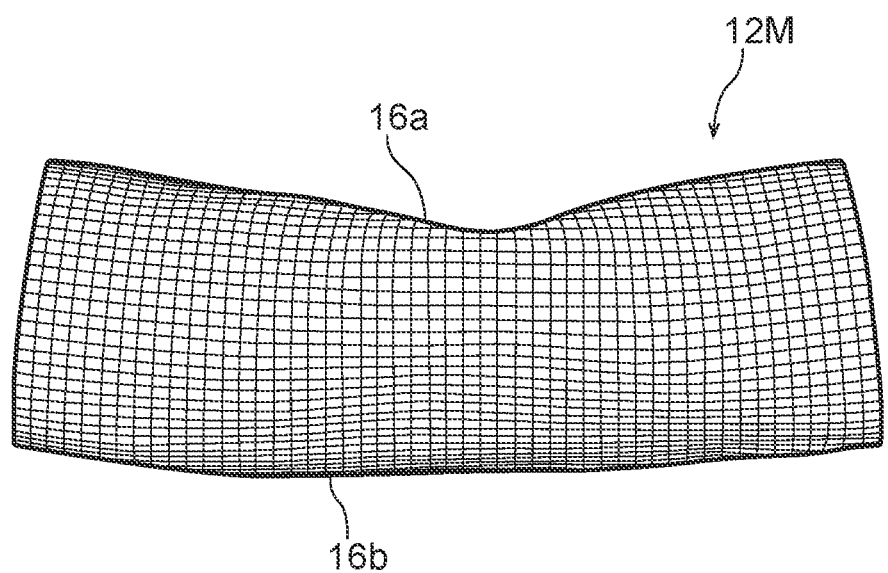
FIG. 2B is a diagram illustrating analysis results to explain a deformation state when compression load acts on a pipe member along its axial direction, and illustrates an example of a deformation state.

FIG. 2A and FIG. 2B are diagrams illustrating analysis results to explain a deformation state when compression load acts along the axial direction of a pipe member 12M of circular cylinder profile, corresponding to one of the pipe members 12 (see FIG. 1A and FIG. 1B) configuring the vehicular structural element 10 (see FIG. 1A and FIG. 1B). FIG. 2A indicates a state prior to deformation of the pipe member 12M. FIG. 2B illustrates an example of a state in which the pipe member 12M illustrated in FIG. 2A and FIG. 2B has deformed under compression load along its axial direction. Moreover, the surface of the pipe member 12M is applied with grid lines in FIG. 2A and FIG. 2B to facilitate understanding of the shape of the pipe member 12M before and after deformation. Moreover, in FIG. 2A and FIG. 2B, the locations on the upper side of the pipe member 12M in the drawing are low rigidity locations 16a having relatively low rigidity that correspond to the inner locations 16A (see FIG. 1B), and the locations on the lower side of the pipe member 12M in the drawing are high rigidity locations 16b having relatively high rigidity that correspond to the outer locations 16B (see FIG. 1B).

As illustrated in FIG. 2A, when compression load acts on the pipe member 12M along its axial direction (see arrows f), first an pipe axial direction intermediate part of the low rigidity locations 16a deforms in a substantial bow shape so as to collapse at the inside of the pipe member 12M, and a pipe axial direction intermediate part of the high rigidity locations 16b deforms so as to bulge toward the outside of the pipe member 12M, as illustrated in FIG. 2B.

Figure 3A:
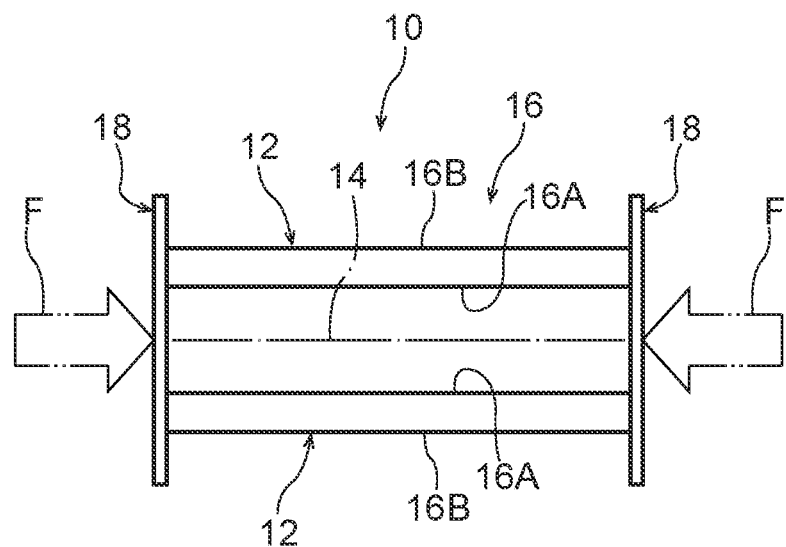
FIG. 3A is a schematic diagram to explain a deformation state of a pipe assembly when compression load acts on a pipe assembly of the vehicle structure of FIG. 1A and FIG. 1B along its axial direction, and illustrates a state prior to deformation.
Figure 3B:
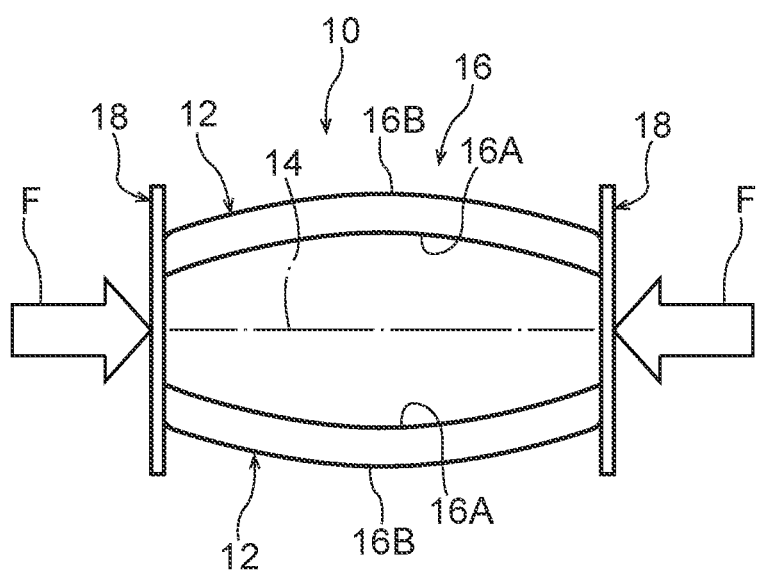
FIG. 3B is a schematic diagram to explain a deformation state of a pipe assembly when compression load acts on a pipe assembly of the vehicle structure of FIG. 1A and FIG. 1B along its axial direction, and illustrates an example of a deformation state.

FIG. 3A and FIG. 3B are schematic illustrations to explain a deformation state of the pipe assembly 16 when compression load acts along the axial direction of the pipe assembly 16 of the vehicular structural element 10. FIG. 3A illustrates a state prior to deformation of the pipe assembly 16, and FIG. 3B illustrates an example of a deformation state of the pipe assembly 16. When compression load acts on the pipe assembly 16 illustrated in FIG. 3A along its axial direction (see arrows F), as each of the pipe members 12 progressively deforms into a curved shape as illustrated in FIG. 3B, the axial direction intermediate part of the pipe assembly 16 progressively adopts a shape (barrel shape) bulging in the opposite direction to the central axis 14 side of the pipe assembly 16.

As deformation of the pipe assembly 16 progresses in this manner, the second moment of area of the vehicular structural element 10 containing the pipe assembly 16 progressively increases. Thus, the flexural rigidity of the vehicular structural element 10 progressively raise in the energy absorption process during a collision. Namely, the vehicular structural element 10 that bears load passively deforms by behaving as if automatically (actively) raising rigidity according to the stage of collision.

Supplementary explanation will now be given for a conceivable comparative structure. For example, consider a comparative structure provided with a sensor to detect a collision, in which an actuation mechanism is actuated based on a detection result of the sensor so as to raise the flexural rigidity of a colliding portion of a vehicle in an energy absorption process during a collision. Were there to be mistaken detection or missed detection by the sensor then the actuation mechanism would not be actuated, and robustness would not be secured. Moreover, such a comparative structure has the disadvantage of increasing costs by an amount commensurate to provision of the sensor. Furthermore, in the comparative structure, a large energy source is needed in order to actuate the actuation mechanism instantaneously so as to coincide with the collision occurrence, and there is also a risk of the actuation mechanism not actuating normally. Further, in cases in which an explosive or the like is employed to actuate the actuation mechanism, then conceivably the actuation mechanism would lose the ability to actuate due to humidity.

In contrast thereto, in the structure of the present exemplary embodiment, there is no need for sensors or actuation mechanisms such as those in comparative structures, enabling the problems with comparative structures to be eliminated.

Moreover, in the present exemplary embodiment, the end retaining members 18 illustrated in FIG. 3A retain the two axial direction end portions of the pipe assembly 16. Thus, when collision load acts on the pipe assembly 16 in its axial direction, as illustrated in FIG. 3B, the pipe assembly 16 progressively deforms such that axial direction intermediate parts of the pipe assembly 16 deform in a shape bulging in the opposite direction to the central axis 14 side in a state in which the two axial direction end portions of the pipe assembly 16 are stably retained by the end retaining members 18. This enables the flexural rigidity of the vehicular structural element 10 containing the pipe assembly 16 to be stably raised in the energy absorption process during a collision.

Moreover, in the present exemplary embodiment, as illustrated in FIG. 3A, axial direction end portions of the pipe assembly 16 are joined to the end retaining members 18 in an abutting state. Thus, in cases in which a collision load acts on the pipe assembly 16 in its axial direction, as illustrated in FIG. 3B, the entire length of the pipe assembly 16 is efficiently utilized, and axial direction intermediate part of the pipe assembly 16 progressively deforms in a shape bulging in the opposite direction to the central axis 14 side.

Figure 4B:
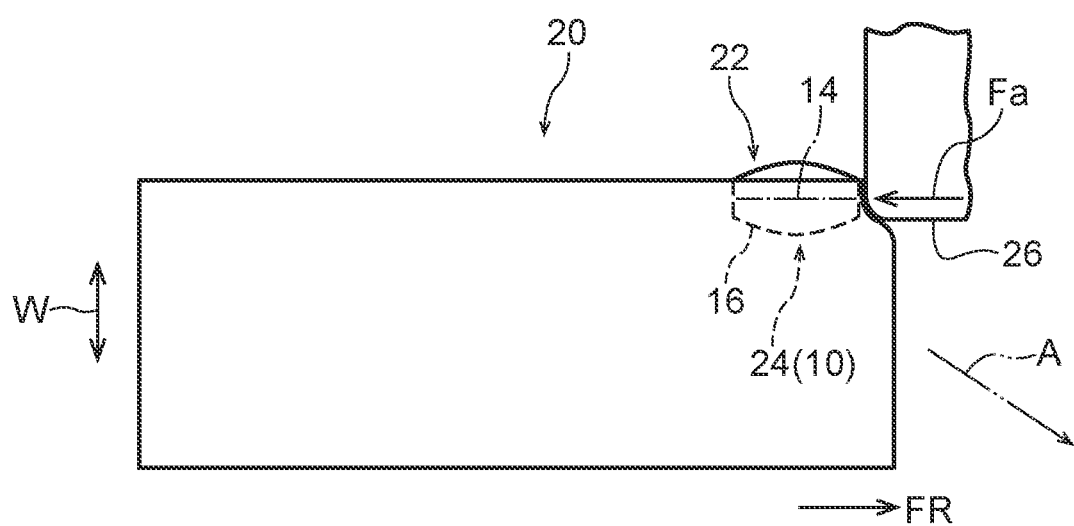
FIG. 4B is a schematic plan view to explain changes in state during a collision of a vehicle provided with the vehicular structural element of FIG. 1A and FIG. 1B, and illustrates an example of a deformation state of the vehicular structural element.

Moreover, as illustrated in FIG. 4A, the vehicular structural element 10 is disposed at the front section side and the side section side of the vehicle 20, and is set such that the axial direction of the pipe assembly 16 runs along the vehicle front-rear direction, in vehicle plan view. Thus, when a location of the vehicle at the front section side and the side section side of the vehicle 20 collides with a collision object 26 (collision counterparty) and collision load Fa is input from the vehicle front, as illustrated in FIG. 4B, the flexural rigidity of the vehicular structural element 10 is progressively raised while the vehicular structural element 10 absorbs energy as the axial direction intermediate part of the pipe assembly 16 deforms so as to bulge in the opposite direction to the central axis 14 side. Raising the flexural rigidity of the vehicular structural element 10 prevents or effectively suppresses the vehicular structural element 10 from breaking. The collision object 26 also readily bears a reaction force from the bulging part deforming, i.e from the axial direction intermediate part of the pipe assembly 16 bulging in the opposite direction to the central axis 14 side as described above, making it easier for the vehicle 20 to move diagonally (see arrow A) with respect to the vehicle front-rear direction so as to glance off the collision object 26. This enables the vehicle 20 to move away from the collision object 26 prior to the vehicle 20 receiving a large impact.

As described above, the vehicular structural element 10 and the vehicle body front section structure of the present exemplary embodiment enable the flexural rigidity to be raised in an energy absorption process during a collision without the use of a sensor. This enables a contribution to be made to improving vehicle performance.

Note that substantially the same operation and advantageous effects to those of the exemplary embodiment above (see FIG. 4A and FIG. 4B) can be obtained even when a configuration as in the modified example of the present exemplary embodiment (not illustrated) is adopted. The modified example is a configuration in which a vehicular structural element configured similarly to the vehicular structural element 10, serving as a vehicle body configuration member of the vehicle body front section 22, is disposed at the front section side and the side section side of the vehicle 20 (a position basically the same as that of the vehicular structural element 10), and in which the axial direction of the pipe assembly 16 is set angled in vehicle plan view toward the vehicle width direction inner side on progression toward the vehicle front in vehicle plan view.

Second Exemplary Embodiment

A vehicular structural element 30 according to a second exemplary embodiment of the present disclosure will now be described, with reference to FIG. 5A and FIG. 5B. FIG. 5A is a perspective view of a vehicular structural element 30 according to the present exemplary embodiment. FIG. 5B is a cross-section illustrating a state sectioned along line 5B-5B (so as to be orthogonal to the central axis 14) in FIG. 5A. As illustrated in FIG. 5A and FIG. 5B, the vehicular structural element 30 according to the present exemplary embodiment differs from the vehicular structural element 10 according to the first exemplary embodiment (see FIG. 1A and FIG. 1B) in that pipe members 32 having elliptical cylinder profiles, and serving as elongated tube shaped members, are provided as substitutes for the pipe members 12 (see FIG. 1A and FIG. 1B). Other configuration is configuration substantially the same as that of the first exemplary embodiment. The same reference signs are accordingly appended to configuration parts substantially the same as that of the first exemplary embodiment, and description is omitted thereof.

As illustrated in FIG. 5A, the vehicular structural element 30 includes four (broadly speaking plural) of the pipe members 32, and includes end retaining members 18 to retain the four pipe members 32 so as to be arranged alongside each other in a circumferential direction about a predetermined central axis 14. The four pipe members 32 extend, for example, in a straight line shape and are disposed parallel to each other at equal intervals around the central axis 14.

The assembly of the four pipe members 32 configures a pipe assembly 36 as a tubular assembly. The two axial direction end portions of the pipe assembly 36 are joined, for example by welding, to flat faces 18A of the end retaining members 18 when in a state in which the positions of length direction end portions of the four pipe members 32 have been aligned and are abutting the flat faces 18A. Namely, the end retaining members 18 retain the two axial direction end portions of the pipe assembly 36 in a similar manner to in the first exemplary embodiment. Note that other than joining by welding, the joining between the end retaining members 18 and the pipe assembly 36 may, for example, be by another joining method, such as adhesive bonding.

The pipe members 32 are formed in the elliptical cylinder profiles as illustrated in FIG. 5A and FIG. 5B from, for example, a metal material (for example, a steel material, aluminum alloy material, or the like). Note that the pipe members 32 may also be formed from a resin material (which might be a fiber reinforced resin material). As illustrated in FIG. 5B, when viewed along the axial direction of the pipe assembly 36, the pipe members 32 are arranged such that the major axes of the pipe members 32 lie along a circle C indicating the boundary between an inner region and an outer region of the pipe assembly 36. When the pipe assembly 36 is viewed along its axial direction, inner locations 36A disposed in an inner region of the pipe assembly 36 are set with thinner wall thicknesses and are set with a lower rigidity in the axial direction than outer locations 36B disposed in an outer region of the pipe assembly 36 when viewed along the axial direction. Note that the axial direction of the pipe assembly 36 is the same as the axial direction of the central axis 14 (a direction perpendicular to the page in FIG. 5B). Moreover, various settings may be adopted for dimension of the pipe members 32 such as the outer diameter, wall thickness, and length direction, depending on the application of the vehicular structural element 30, similarly to in the first exemplary embodiment.

Moreover, the vehicular structural element 30 of the present exemplary embodiment, for example, serves as a front side member 24 of a vehicle body front section 22 and, substituting for the vehicular structural element 10 illustrated in FIG. 4A, is disposed at the front section side and the side section side of the vehicle 20. The axial direction of the pipe assembly 36 (see FIG. 5A and FIG. 5B) is set so as to lie along the vehicle front-rear direction in vehicle plan view, or to be angled toward the vehicle width direction inner side on progression toward the vehicle front.

Operation and Advantageous Effects

The configuration of the present exemplary embodiment as described above is also able to obtain the same operation and advantageous effects to those of the first exemplary embodiment.

Moreover, in the present exemplary embodiment, the four pipe members 32 illustrated in FIG. 5A and FIG. 5B are formed with elliptical cylinder profiles, and are arranged such that, when viewed along the axial direction of the pipe assembly 36, the major axes of the pipe members 32 lie along a circle C indicating the boundary between the inner region and the outer region of the pipe assembly 36. Thus, compared to the pipe assembly 16 of the first exemplary embodiment (see FIG. 1A and FIG. 1B), when collision load acts on the pipe assembly 36 along the axial direction, the pipe assembly 36 is even less liable to adopt a deformation mode in which an axial direction intermediate part of the pipe assembly 36 is compressed toward the central axis 14 side, and the pipe assembly 36 even more readily adopts a deformation mode in which the axial direction intermediate part of the pipe assembly 36 bulges in the opposite direction to the central axis 14 side. The present exemplary embodiment accordingly enables the flexural rigidity to be raised in a more stable manner in an energy absorption process during a collision.

Third Exemplary Embodiment

A vehicular structural element 40 according to a third exemplary embodiment of the present disclosure will now be described, with reference to FIG. 6A and FIG. 6B. FIG. 6A is a perspective view of a vehicular structural element 40 according to the present exemplary embodiment. FIG. 6B is a cross-section illustrating a state sectioned along line 6B-6B (so as to be orthogonal to the central axis 14) in FIG. 6A. As illustrated in FIG. 6A and FIG. 6B, the vehicular structural element 40 according to the present exemplary embodiment has a configuration including an intermediate retaining member 42 as a retaining member in addition to the vehicular structural element 10 according to the first exemplary embodiment (see FIG. 1A and FIG. 1B). The same reference signs are accordingly appended to configuration parts substantially the same as that of the first exemplary embodiment, and description is omitted thereof.

As illustrated in FIG. 6A and FIG. 6B, the vehicular structural element 40 includes the intermediate retaining member 42 provided at a location on the central axis 14 side of an axial direction intermediate part of the pipe assembly 16. The intermediate retaining member 42 is provided with a retaining tube member 44 formed by a short tube shape of cross-shaped profile, and is provided with end plates 46 respectively joined to the two tube axial direction end faces of the retaining tube member 44 by welding, for example. Note that the retaining tube member 44 and the end plates 46 may, for example, be joined by adhesive bonding or the like. The end plates 46 serve as plate shaped members of cross-shaped profile, and close off respective openings at the two tube axial direction ends of the retaining tube member 44. When viewed along the axial direction of the pipe assembly 36, the end plates 46 are set such that the outer profile of the end plates 46 overlap the outer profile of the retaining tube member 44.

The retaining tube member 44 and the end plates 46 are formed, for example, from a metal material (for example, a steel material, aluminum alloy material, or the like). The retaining tube member 44 and the end plates 46 may be formed from a resin material (which might be a fiber reinforced resin material). The materials of the retaining tube member 44 and the end plates 46 are preferably the same as each other.

The intermediate retaining member 42 is joined to inner locations 16A of the pipe assembly 16 by welding, for example. More precisely, each of the pipe members 12 is disposed such that a total of two locations of the inner locations 16A that are close to the outer locations 16B contact (are supported by) the intermediate retaining member 42, and each pipe member 12 is joined to the intermediate retaining member 42 at these two locations. The intermediate retaining member 42 may be joined to the inner locations 16A of the pipe assembly 16 by adhesive bonding or the like. The intermediate retaining member 42 is set such that the joins to the inner locations 16A of the pipe assembly 16 are released when loads of a predetermined value or greater in directions away from the central axis 14 are received through the inner locations 16A of the pipe assembly 16.

The welding joins between the intermediate retaining member 42 and the inner locations 16A of the pipe assembly 16 can be set so as to have a joining strength of less than the predetermined value by employing a short joint distance or employing non-continuous welding. Moreover, when, as in a modified example of the present exemplary embodiment, the intermediate retaining member 42 and the inner locations 16A of the pipe assembly 16 are joined by adhesive bonding (using an adhesive), the joining strength can be set to less than the predetermined value by suppressing the adhesive bonding surface area, by employing an adhesive having a low adhesive strength, and the like.

Moreover, the vehicular structural element 40 of the present exemplary embodiment, for example, serves as a front side member 24 of a vehicle body front section 22 and, substituting for the vehicular structural element 10 illustrated in FIG. 4A, is disposed at the front section side and the side section side of the vehicle 20. The axial direction of the pipe assembly 16 is set in vehicle plan view so as to lie along the vehicle front-rear direction, or to be angled toward the vehicle width direction inner side on progression toward the vehicle front.

Operation and Advantageous Effects

The configuration of the present exemplary embodiment as described above is also able to obtain the same operation and advantageous effects to those of the first exemplary embodiment.

Moreover, in the present exemplary embodiment, when collision load acts along the axial direction of the pipe assembly 16 illustrated in FIG. 6A and FIG. 6B, supposing the pipe assembly 16 were to attempt to deform by an axial direction intermediate part of the pipe assembly 16 being compressed toward the central axis 14 side, then such deformation would be suppressed by the intermediate retaining member 42. That is to say, in the present exemplary embodiment, each of the pipe members 12 is supported by the intermediate retaining member 42 at a total of two locations, and deformation at an axial direction intermediate part of the pipe assembly 16 in which each of the pipe members 12 deforms so as to attempt to approach the central axis 14 side is suppressed in a stable manner.

Moreover, in the present exemplary embodiment, the joining between the intermediate retaining member 42 and the inner locations 16A of the pipe assembly 16 is released when a collision load acts such that an axial direction intermediate part of the pipe assembly 16 attempts to deform in the opposite direction to the central axis 14 side. This enables the axial direction intermediate part of the pipe assembly 16 to deform so as to bulge in the opposite direction to the central axis 14 side.

Moreover, in the present exemplary embodiment, the intermediate retaining member 42 and the inner locations 16A of the pipe assembly 16 are joined by welding. This enables the joining between the intermediate retaining member 42 and the inner locations 16A of the pipe assembly 16 to be easily set so as to release when the intermediate retaining member 42 receives a load of a predetermined value or greater in a direction away from the central axis 14 through the inner locations 16A of the pipe assembly 16.

Modified Examples

In cases in which, as a modified example of the present exemplary embodiment, the intermediate retaining member 42 and the inner locations 16A of the pipe assembly 16 are joined by adhesive bonding, the joining between the intermediate retaining member 42 and the inner locations 16A of the pipe assembly 16 can still be easily set so as to release when a load of a predetermined value or greater when the intermediate retaining member 42 receives a load of a predetermined value or greater in a direction away from the central axis 14 through the inner locations 16A of the pipe assembly 16.

Note that, as modified examples of the present exemplary embodiment, a member similar to the retaining tube members 44 may be disposed as an intermediate retaining member substituting for the intermediate retaining member 42, or, for example, substituting for the intermediate retaining member 42, members of cross-shape profile that are solid like the end plates 46, etc., may be disposed as the intermediate retaining member. Such modified examples are also able to obtain substantially the same operation and advantageous effects to those of the present exemplary embodiment.

Fourth Exemplary Embodiment

Figure 7B:
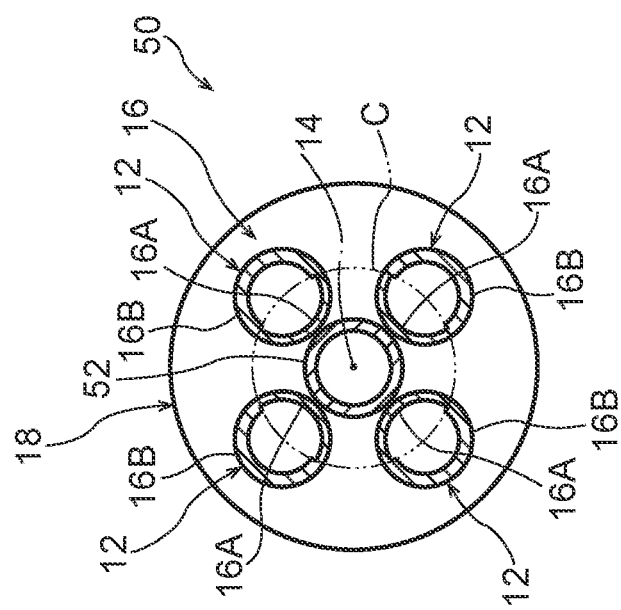
FIG. 7B is a cross-section illustrating a state sectioned along line 7B-7B in FIG. 7A.
Figure 7A:
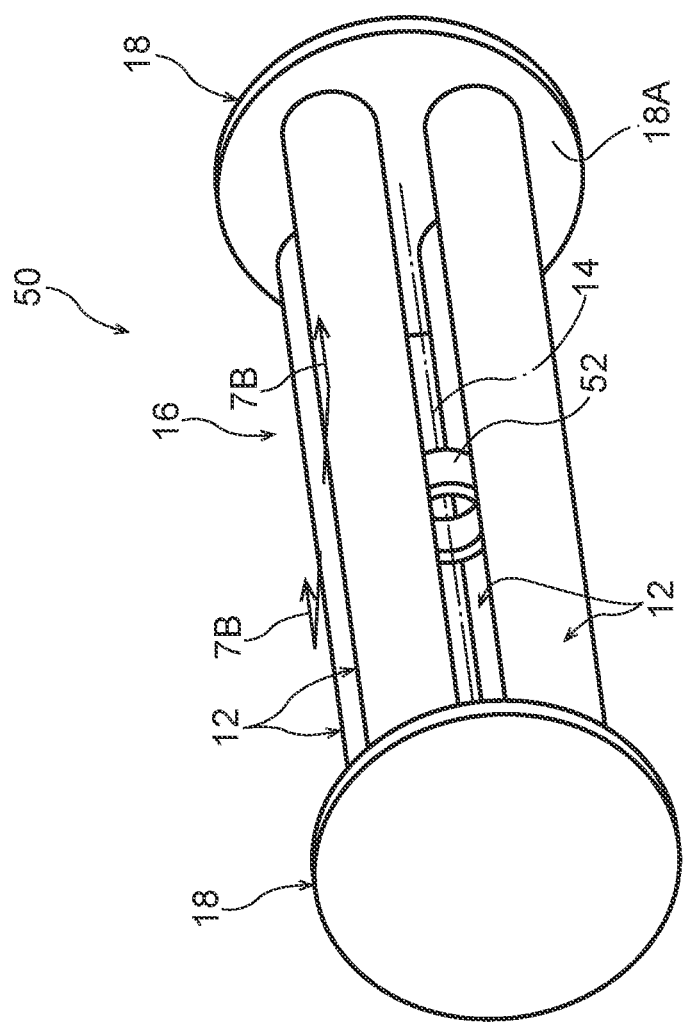
FIG. 7A is a perspective view illustrating a vehicular structural element according to a fourth exemplary embodiment of the present disclosure.

A vehicular structural element 50 according to a fourth exemplary embodiment of the present disclosure will now be described, with reference to FIG. 7A and FIG. 7B. FIG. 7A is a perspective view of the vehicular structural element 50 according to the present exemplary embodiment. FIG. 7B is a cross-section illustrating a state sectioned along line 7B-7B (so as to be orthogonal to the central axis 14) in FIG. 7A. As illustrated in FIG. 7A and FIG. 7B, the vehicular structural element 50 according to the present exemplary embodiment has a configuration including an intermediate retaining member 52 as a retaining member in addition to the vehicular structural element 10 according to the first exemplary embodiment (see FIG. 1A and FIG. 1B). The same reference signs are accordingly appended to configuration parts substantially the same as that of the first exemplary embodiment, and description is omitted thereof.

As illustrated in FIG. 7A and FIG. 7B, the vehicular structural element 50 includes an intermediate retaining member 52 provided at a location at the central axis 14 side of an axial direction intermediate part of the pipe assembly 16. The intermediate retaining member 52 is, for example, formed in a short circular cylinder shape from a metal material (for example, steel, an aluminum alloy material, or the like). Note that the intermediate retaining member 52 may be formed from a resin material (which might be a fiber reinforced resin material).

The intermediate retaining member 52 is joined to the inner locations 16A of the pipe assembly 16 by welding, for example. More precisely, each of the pipe members 12 is disposed such that from out of the inner locations 16A, the location disposed on an imaginary straight line connecting the central axis of the pipe member 12 to the central axis 14 contacts the intermediate retaining member 52 and is joined to (is supported by) the intermediate retaining member 52.

The intermediate retaining member 52 may, for example, be joined to the inner locations 16A of the pipe assembly 16 by adhesive bonding or the like. The intermediate retaining member 52 is set such that the joins to the inner locations 16A of the pipe assembly 16 are released when loads in directions away from the central axis 14 of a predetermined value or greater are received through the inner locations 16A of the pipe assembly 16.

Moreover, the vehicular structural element 50 of the present exemplary embodiment, for example, serves as a front side member 24 of a vehicle body front section 22 and, substituting for the vehicular structural element 10 illustrated in FIG. 4A, is disposed at the front section side and the side section side of the vehicle 20. The axial direction of the pipe assembly 16 is set in vehicle plan view so as to lie along the vehicle front-rear direction, or to be angled toward the vehicle width direction inner side on progression toward the vehicle front.

Operation and Advantageous Effects

The configuration of the present exemplary embodiment as described above is also able to obtain the same operation and advantageous effects to those of the first exemplary embodiment.

Moreover, in the present exemplary embodiment, when a collision load acts on the pipe assembly 16 illustrated in FIG. 7A and FIG. 7B in its axial direction, supposing the pipe assembly 16 were to attempt to deform by an axial direction intermediate part of the pipe assembly 16 being compressed toward the central axis 14 side, then such deformation would be suppressed by the intermediate retaining member 52. That is to say, in the present exemplary embodiment, each of the pipe members 12 is supported by the intermediate retaining member 52 at locations on imaginary straight lines connecting the central axis of the respective pipe member 12 and the central axis 14. Thus, deformation at an axial direction intermediate part of the pipe assembly 16 in which each of the pipe members 12 deforms so as to attempt to approach the central axis 14 side is suppressed in a stable manner.

In the present exemplary embodiment, the joining between the intermediate retaining member 52 and the inner locations 16A of the pipe assembly 16 is released when collision load acts such that an axial direction intermediate part of the pipe assembly 16 attempts to deform by bulging in the opposite direction to the central axis 14 side. The axial direction intermediate part of the pipe assembly 16 can thereby be made to deform so as bulge in the opposite direction to the central axis 14 side.

Moreover, in the present exemplary embodiment, the intermediate retaining member 52 and the inner locations 16A of the pipe assembly 16 are joined by welding. This enables the joining between the intermediate retaining member 52 and the inner locations 16A of the pipe assembly 16 to be easily set so as to be released when the intermediate retaining member 52 receives a load of a predetermined value or greater in a direction away from the central axis 14 through the inner locations 16A of the pipe assembly 16.

Note that in cases in which, as a modified example of the present exemplary embodiment, the intermediate retaining member 52 and the inner locations 16A of the pipe assembly 16 are joined by adhesive bonding (using an adhesive), the joining between the intermediate retaining member 52 and the inner locations 16A of the pipe assembly 16 can still be easily set so as to release when the intermediate retaining member 52 receives a load of a predetermined value or greater in a direction away from the central axis 14 through the inner locations 16A of the pipe assembly 16.

Moreover, in the present exemplary embodiment, a reduction in weight can be achieved compared to the configuration of the third exemplary embodiment.

Fifth Exemplary Embodiment

A vehicular structural element 60 according to a fifth exemplary embodiment of the present disclosure will now be described, with reference to FIG. 8A and FIG. 8B. FIG. 8A is a perspective view of the vehicular structural element 60 according to the present exemplary embodiment. FIG. 8B is a cross-section illustrating a state sectioned along line 8B-8B (so as to be orthogonal to the central axis 14) in FIG. 8A. As illustrated in FIG. 8A and FIG. 8B, the vehicular structural element 60 according to the present exemplary embodiment has a configuration including a band shaped member 62 as a retaining member in addition to the vehicular structural element 10 according to the first exemplary embodiment (see FIG. 1A and FIG. 1B). The same reference signs are accordingly appended to configuration parts substantially the same as that of the first exemplary embodiment, and description is omitted thereof.

As illustrated in FIG. 8A and FIG. 8B, the vehicular structural element 60 includes the band shaped member 62 wrapped so as to span the entire perimeter at the outer peripheral side of an axial direction intermediate part of the pipe assembly 16. The band shaped member 62 is formed in a ring shape by a metal material (for example, steel, an aluminum alloy material, or the like). Note that the band shaped member 62 may be formed from a resin material (which might be a fiber reinforced resin material).

The band shaped member 62 is joined to the outer locations 16B of the pipe assembly 16 by welding, for example. More precisely, the band shaped member 62 is disposed along respective portions of each of the pipe members 12 at the outer peripheral face of the outer locations 16B so as to make contact therewith. The band shaped member 62 thereby includes a total of four circular arc shaped contact portions 62A, and the inner faces of the contact portions 62A are joined to the respective pipe members 12. Note that the band shaped member 62 may, for example, be joined to the outer locations 16B of the pipe assembly 16 by adhesive bonding, mechanical fastening (such as bolt fastening or rivet fastening), or the like.

The band shaped member 62 also includes a total of four non-contact portions 62B that do not contact the outer locations 16B of the pipe assembly 16. The non-contact portions 62B and the contact portions 62A are set alternately to each other when viewed along the axial direction of the pipe assembly 16. Moreover, the non-contact portions 62B are formed with non-straight-line profiles (in the present exemplary embodiment, for example, with circular arc shapes that are convex to the radial direction outside of the band shaped member 62) when viewed along the axial direction of the pipe assembly 16. Namely, when viewed along the axial direction of the pipe assembly 16, the non-contact portions 62B are set with a surplus length that is a longer portion than the length that would arise supposing the non-contact portions (62B) were set with straight line shapes.

The non-contact portions 62B are formed, for example, with a similar profile to the contact portions 62A when viewed along the axial direction of the pipe assembly 16. However, as a modified example of the present exemplary embodiment, non-contact portions formed with nonstraight-line profiles when viewed along the axial direction of the pipe assembly (16) (configuration parts corresponding to the non-contact portions 62B of the present exemplary embodiment) may be formed with different profiles to those of the contact portions (configuration parts corresponding to the contact portions 62A of the present exemplary embodiment) when viewed along the axial direction of the pipe assembly (16).

Moreover, the vehicular structural element 60 of the present exemplary embodiment may, for example, serve as a front side member 24 of a vehicle body front section 22 and, substituting for the vehicular structural element 10 illustrated in FIG. 4A, be disposed at the front section side and the side section side of the vehicle 20. The axial direction of the pipe assembly 16 is set in vehicle plan view so as to lie along the vehicle front-rear direction, or to be angled toward the vehicle width direction inner side on progression toward the vehicle front.

Operation and Advantageous Effects

The configuration of the present exemplary embodiment as described above is also able to obtain the same operation and advantageous effects to those of the first exemplary embodiment.

Moreover, in the present exemplary embodiment, due to setting surplus length in the non-contact portions 62B as illustrated in FIG. 8A and FIG. 8B, when a collision load acts in the axial direction to the pipe assembly 16 such that an axial direction intermediate part of the pipe assembly 16 attempts to deform by bulging in the opposite direction to the central axis 14 side, in response thereto, the band shaped member 62 deforms within the range of the surplus length thereof. This enables the axial direction intermediate part of the pipe assembly 16 to deform so as to bulge in the opposite direction to the central axis 14 side within a predetermined range.

Moreover, when the band shaped member 62 has deformed to the limit of the surplus length range, supposing the axial direction intermediate part of the pipe assembly 16 were to attempt to deform by bulging further in the opposite direction to the central axis 14 side, then such deformation would be suppressed by the band shaped member 62. Namely, the axial direction intermediate part of the pipe assembly 16 can be suppressed from deforming excessively in the opposite direction to the central axis 14 side.

Additional Description of Exemplary Embodiments

Note that although in the exemplary embodiments described above the vehicular structural elements 10, 30, 40, 50, 60 illustrated in FIG. 1A, FIG. 1B, FIG. 5A to FIG. 8B, etc., include the pipe members 12, 32 as four elongated tube shaped members, a vehicular structural element may include a plural number of elongated tube shaped members other than four, for example, two, three, five, etc.

Moreover, although in the exemplary embodiments described above the pipe members 12, 32, serving as elongated tube shaped members, are formed with either a circular cylinder profile or an elliptical cylinder profile, the elongated tube shaped members may, for example, be formed by other elongated tube shaped members, such as elongated tube shaped members formed with a polygonal tube shape or the like.

Moreover, although in the exemplary embodiments described above the pipe members 12, 32, serving as elongated tube shaped members, are formed from members that extend in a straight line shape, the elongated tube shaped members may be members with a configuration that includes a curved portion. Namely, a vehicular structural element configured by plural elongated tube shaped members may include curved shaped portions, instead of having a straight line shape when viewed in its entirety. Moreover, for example, a front side member serving as a vehicle body configuration member configured with a vehicular structural element may include a side member front section and a side member rear section configured as follows. The side member front section is disposed at a side portion of a power unit chamber in a vehicle body front structure and extends in the vehicle body front-rear direction. The side member rear section is contiguous to a rear end of the side member front section, is provided with a kick portion extending toward a vehicle body rear lower side along a dashboard section (a vehicle body passenger cabin front wall), and includes an extension portion extending from a rear end of the kick portion toward the vehicle body rear.

Moreover, the exemplary embodiments described above, the pipe assemblies 16, 36 have the inner locations 16A, 36A disposed at an inner region when viewed along the axial direction set with thinner wall thickness, and set with lower rigidity in the axial direction, than those of the outer locations 16B, 36B disposed at an outer region when viewed along the axial direction. However, in order to set such a difference in rigidity, the following modified example of a configuration may be adopted instead of setting the difference in wall thickness described above. Namely, for example, a configuration may be adopted in which the material configuring the inner locations (16A, 36A) is a material having a lower rigidity in the axial direction (the axial direction of a central axis (14)) than the material configuring the outer locations (16B, 36B). Moreover, in another modified example, a configuration may be adopted in which, for example, a composite sheet (also referred to as a "patch") with a high relative rigidity and relative strength may be adhered to the outer locations (16B, 36B) and nothing adhered to the inner locations (16A, 36A). Moreover, in another modified example, a configuration may be adopted in which, for example, the rigidity in the axial direction (the axial direction of a central axis 14) of the inner locations (16A, 36A) may be set lower than that of the outer locations (16B, 36B) by, instead of setting the wall thickness as described above, setting a three-dimensional profile, such as by forming ribs only on the outer locations (16B, 36B).

Moreover, although the above exemplary embodiments adopt preferable configurations in which the vehicular structural elements 10, 30, 40, 50, 60 include the end retaining members 18 as retaining members to retain two axial direction ends of the pipe assemblies 16, 36, the vehicular structural element may, instead of the end retaining members 18, include retaining members that retain the pipe assemblies (16, 36) closer to the axial direction center than the axial direction ends of the pipe assemblies (16, 36).

Moreover, although in the above exemplary embodiments the axial direction ends of the pipe assemblies 16, 36 are joined to the end retaining members 18 in a state abutted thereagainst, as a modified example of the above exemplary embodiments, end retaining members serving as retaining members may, for example, retain the two axial direction ends of the pipe assemblies (16, 36) from the circumferential inside or the circumferential outside.

Note that known retaining members, such as those disclosed in Japanese Patent No. 6020116, are applicable as the retaining member to retain assemblies of plural elongated tube shaped members.

Moreover, from the perspective of ease of setting a joining strength to be less than a predetermined value, although the above exemplary embodiments and their modified examples adopt preferable configurations in which the intermediate retaining members 42, 52 are joined to the inner locations 16A of the pipe assembly 16 by welding or adhesive bonding, the intermediate retaining members 42, 52 may be joined to the inner locations 16A of the pipe assembly 16 by mechanical fastening (such as bolt fastening or rivet fastening).

Moreover, although configurations have been described in the above exemplary embodiment in which the vehicular structural elements 10, 30, 40, 50, 60 configure the front side member 24 serving as a vehicle body configuration member of the vehicle body front section 22 and are disposed to the front section side and the side section side of the vehicle 20, a configuration may be adopted in which a vehicular structural element configures a vehicle body configuration member other than a front side member.

Note that various combinations of the above exemplary embodiments and above modified examples may be implemented.

Although examples of the present disclosure have been described above, the present disclosure is not limited thereto, and various other modifications may be implemented within a range not departing from the spirit of the present disclosure.

An object of the present disclosure is to obtain a vehicular structural element and a vehicle body front section structure that are capable of raising flexural rigidity in an energy absorption process during a collision without the use of a sensor.

A first aspect of a vehicular structural element includes: a plurality of elongated tube-shaped members; and a retaining member that retains the plurality of elongated tube-shaped members, such that they are disposed alongside each other in a circumferential direction with respect to a predetermined central axis. A tubular assembly configured by an assembly of the plurality of elongated tube-shaped members has inner locations disposed at an inner region viewed along an axial direction set with a lower rigidity in the axial direction than outer locations disposed at an outer region viewed along the axial direction.

According to the above configuration, the retaining member retains the plural elongated tube shaped members so as to be disposed alongside each other in a circumferential direction about a predetermined central axis. The tubular assembly configured by an assembly of the plural elongated tube shaped members has inner locations disposed at the inner region when viewed along an axial direction set with a lower rigidity in the axial direction than outer locations disposed at the outer region when viewed along the axial direction. Thus, when a collision load acts on the pipe assembly in its axial direction, energy is absorbed as the inner locations deform so as to collapse at the inside of the elongated tube shaped members, and as the outer locations deform so as to bulge toward the outside of the elongated tube shaped members. Moreover, as the inner locations deform so as to collapse at the inside of the elongated tube shaped members, and as the outer locations progressively deform so as to bulge toward the outside of the elongated tube shaped members, an axial direction intermediate part of the tubular assembly progressively adopts a shape bulging in the opposite direction to the central axis of the tubular assembly, and the second moment of area of the vehicular structural element containing the tubular assembly progressively increases. The flexural rigidity of the vehicular structural element accordingly progressively rises in an energy absorption process during a collision.

A second aspect is the first aspect of the vehicular structural element. The retaining member includes end retaining members that retain two axial direction ends of the tubular assembly.

The above configuration includes the end retaining members as retaining members, and the end retaining members retain the two axial direction ends of the tubular assembly. Hence, when a collision load acts on the tube assembly in its axial direction, in a state in which the two axial direction ends of the tubular assembly are stably retained by the end retaining members, the axial direction intermediate part of the tubular assembly progressively deforms into a shape bulging in the opposite direction to the central axis of the tubular assembly. This enables the flexural rigidity of the vehicular structural element containing the tubular assembly to be stably raised in the energy absorption process during a collision.

A third aspect is the second aspect of the vehicular structural element. The two axial direction ends of the tubular assembly are joined to the end retaining members in a state in which positions of longitudinal direction ends of the plurality of elongated tube-shaped members are aligned with each other and abut the end retaining members.

In the above configuration, the two axial direction ends of the tubular assembly are joined to the end retaining members in a state abutting the end retaining members. Thus, when a collision load acts on the tube assembly in its axial direction, the entire length of the tubular assembly is efficiently utilized, and the axial direction intermediate part of the tubular assembly progressively deforms in a shape bulging in the opposite direction to the central axis.

A fourth aspect is the second or the third aspect of the vehicular structural element. The retaining member includes an intermediate retaining member. The intermediate retaining member is provided at a location on a central axis side with respect to an axial direction intermediate part of the tubular assembly and is joined to the inner locations of the tubular assembly. The intermediate retaining member is set such that joining to the inner locations is released in a case in which a load of a predetermined value or greater in a direction away from the central axis is received through the inner locations.

The above configuration includes the intermediate retaining member as a retaining member, and the intermediate retaining member is provided at a location on the central axis side of an axial direction intermediate part of the tubular assembly and is joined to the inner locations of the tubular assembly. Thus, when collision load acts on the tubular assembly in its axial direction, supposing the axial direction intermediate part of the tube assembly were to attempt to deform so as to collapse at the central axis side, then such deformation would be suppressed by the intermediate retaining member.

Moreover, the intermediate retaining member is set such that joining to the inner locations of the tubular assembly is released when a load of the predetermined value or greater in a direction away from the central axis is received through the inner locations of the tubular assembly. Thus, when a collision load acts and the axial direction intermediate part of the tubular assembly attempts to deform so as to bulge in the opposite direction to the central axis side, the joining between the intermediate retaining member and the inner locations of the tubular assembly is released. This enables the axial direction intermediate part of the tubular assembly to deform so as to bulge in the opposite direction to the central axis side.

A fifth aspect is the fourth aspect of the vehicular structural element. The intermediate retaining member is joined to the inner locations of the tubular assembly by welding or by using adhesive bonding.

In the above configuration, the intermediate retaining member is joined to the inner locations of the tubular assembly by welding or adhesive bonding. This enables easy setting such that the joining between the intermediate retaining member and the inner locations of the tubular assembly is released when the load of the predetermined value or greater in a direction away from the central axis is received by the intermediate retaining member through the inner locations of the tubular assembly.

A sixth aspect is any of the second to the fifth aspects of the vehicular structural element. The retaining member includes a band-shaped member, the band-shaped member is wrapped around so as to span an entire periphery at an outer peripheral side of an axial direction intermediate part of the tubular assembly and is joined to the outer locations of the tubular assembly; and the band-shaped member includes a non-contact portion that does not contact the outer locations and is formed with a non-straight-line profile viewed along the axial direction of the tubular assembly.

In the above configuration, the retaining member includes the band shaped member, and the band shaped member is wrapped around so as to span the entire periphery at an outer peripheral side of the axial direction intermediate part of the tubular assembly and is joined to the outer locations of the tubular assembly. The band shaped member includes the non-contact portion that does not contact the outer locations of the tubular assembly and is formed with a non-straight-line profile when viewed along the axial direction of the tubular assembly. The non-contact portion is set with surplus length that is a longer portion than the length that would arise supposing the non-contact portion was set with a straight line shape when viewed along the axial direction of the tubular assembly. Thus, when a collision load acts on the tubular assembly in its axial direction, and the axial direction intermediate part of the tubular assembly attempts to deform so as to bulge in the opposite direction to the central axis side, in response thereto, the band shaped member deforms within the surplus length range. This enabling the axial direction intermediate part of the tubular assembly to deform so as to bulge in the opposite direction to the central axis side within a predetermined range.

Moreover, when the band shaped member has deformed to the limit of the surplus length range, even supposing that the axial direction intermediate part of the tubular assembly attempts to deform so as to bulge further in the opposite direction to the central axis side, such deformation is suppressed by the band shaped member. Namely, the axial direction intermediate part of the tubular assembly can be suppressed from deforming excessively in the opposite direction to the central axis side.

A seventh aspect is a vehicle body front section structure that includes: the vehicular structural element of any of the first to the sixth aspects. The vehicular structural element configures a vehicle body configuration member of a vehicle body front section and is disposed at a front section side and a side section side of a vehicle, and the vehicular structural element is set so that, in a vehicle plan view, an axial direction of the tubular assembly runs along a vehicle front-rear direction or is inclined toward a vehicle width direction inner side on progression toward a vehicle front.

In the above configuration, when a location at the front section side and the side section side of the vehicle collides with a collision counterparty and collision load is input from the vehicle front, the flexural rigidity of the vehicular structural element is progressively raised while the vehicular structural element absorbs energy as the axial direction intermediate part of the tubular assembly deforms so as to bulge in the opposite direction to the central axis side. Moreover, a reaction force of the collision counterparty is readily received through a bulged part arising from the axial direction intermediate part of the tubular assembly deforming so as to attempt to bulge in the opposite direction to the central axis side as described above, making it easier for the vehicle to move diagonally with respect to the vehicle front-rear direction so as to glance off the collision counterparty.

As explained above, the vehicular structural element and the vehicle body front section structure of the present disclosure exhibit the excellent advantageous effects of enabling flexural rigidity to be raised in an energy absorption process during a collision, without the use of a sensor.

What is claimed is:

1. A vehicular structural element comprising:
    a tubular assembly having a central axis and comprising
        a plurality of elongated tube-shaped members extending in an axial direction parallel to the central axis; and
    a retaining member that retains the plurality of elongated tube-shaped members, such that they are disposed alongside each other in a circumferential direction with respect to the central axis,
    wherein:
        the tubular assembly includes an outer region and an inner region positioned closer to the central axis than the outer region, and
        the inner region has a lower rigidity in the axial direction than the outer region.

2. The vehicular structural element of claim 1, wherein the retaining member includes end retaining members that retain two axial direction ends of the tubular assembly.

3. The vehicular structural element of claim 2, wherein the two axial direction ends of the tubular assembly are joined to the end retaining members in a state in which positions of longitudinal direction ends of the plurality of elongated tube-shaped members are aligned with each other and abut the end retaining members.

4. The vehicular structural element of claim 2, wherein:
    the retaining member includes an intermediate retaining member, the intermediate retaining member being provided axially between the end retaining members and on a central axis side of the elongated tube-shaped members, and being joined to the inner region of the tubular assembly; and
    the intermediate retaining member is configured such that joining to the inner region is released in a case in which a load of a predetermined value or greater in a direction away from the central axis is received through the inner region.

5. The vehicular structural element of claim 4, wherein the intermediate retaining member is joined to the inner region of the tubular assembly by welding or adhesive bonding.

6. The vehicular structural element of claim 2, wherein:
    the retaining member includes a band-shaped member wrapped entirely around an outer peripheral side of the tubular assembly at a position axially between the end retaining members, and joined to the outer region of the tubular assembly; and the band-shaped member includes a non-contact portion that does not contact the outer region and is formed with a non-straight-line profile as viewed along the axial direction of the tubular assembly.

7. A vehicle body front section structure comprising: the vehicular structural element of claim 1, wherein:
the vehicular structural element configures a vehicle body configuration member of a vehicle body front section and is disposed at a front section side and a side section side of a vehicle, and
the vehicular structural element is configured such that, in a vehicle plan view, the axial direction of the tubular assembly runs along a vehicle front-rear direction or is inclined toward a vehicle width direction inner side on progression toward a vehicle front.

8. The vehicular structural element of claim 1, wherein the plurality of elongated tube-shaped members are disposed at predetermined intervals.

9. The vehicular structural element according to claim 1, wherein:
the outer region comprises a first portion of a wall of each of the elongated tube-shaped members; and
the inner region comprises a second portion of a wall of each of the elongated tube-shape members that is positioned closer to the central axis than the first portion.

* * * * *